(12) United States Patent
Guo et al.

(10) Patent No.: US 8,758,491 B2
(45) Date of Patent: Jun. 24, 2014

(54) THIN FILM GAS SEPARATION MEMBRANES

(75) Inventors: Grace Guo, Shanghai (CN); Stephen Yates, South Barrington, IL (US); Zhongxi Huang, Shanghai (CN); Jeffrey Han, Shanghai (CN); Mengshi Lu, Shanghai (CN)

(73) Assignee: Honeywell International Inc., Morristown, NJ (US)

( * ) Notice: Subject to any disclaimer, the term of this patent is extended or adjusted under 35 U.S.C. 154(b) by 264 days.

(21) Appl. No.: 13/389,426

(22) PCT Filed: Jun. 17, 2011

(86) PCT No.: PCT/CN2011/001008
§ 371 (c)(1), (2), (4) Date: Feb. 7, 2012

(87) PCT Pub. No.: WO2012/171143
PCT Pub. Date: Dec. 20, 2012

(65) Prior Publication Data
US 2014/0026756 A1 Jan. 30, 2014

(51) Int. Cl.
*B01D 53/22* (2006.01)
*B01D 71/64* (2006.01)
*C08G 73/10* (2006.01)

(52) U.S. Cl.
CPC .............. *B01D 53/228* (2013.01); *B01D 71/64* (2013.01); *C08G 73/1042* (2013.01); *C08G 73/1067* (2013.01)
USPC .................. 96/10; 96/4; 96/14; 95/51; 95/54; 95/55

(58) Field of Classification Search
CPC ...... B01D 53/228; B01D 63/02; B01D 69/08; B01D 69/10; B01D 71/64; B01D 2257/104; B01D 2257/108; B01D 2257/504; C08G 73/10; C08G 73/1039; C08G 73/1042; C08G 73/1067; C08G 73/1071; C08L 79/08; Y02C 10/10
USPC ............ 96/4, 8, 10, 11, 13, 14; 95/45, 51, 54, 95/55
See application file for complete search history.

(56) References Cited

U.S. PATENT DOCUMENTS

| | | | |
|---|---|---|---|
| 4,705,540 A | 11/1987 | Hayes | |
| 4,717,393 A | 1/1988 | Hayes | |

(Continued)

OTHER PUBLICATIONS

PCT International Search Report, dated Mar. 8, 2012.

(Continued)

*Primary Examiner* — Jason M Greene
(74) *Attorney, Agent, or Firm* — Shimokaji & Assoc., P.C.

(57) ABSTRACT

A gas separation membrane comprises aromatic polyimide polymers that comprise a plurality of repeating units of formula (I)

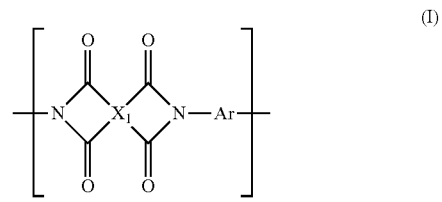

wherein $X_1$ and Ar are herein defined.

11 Claims, 4 Drawing Sheets

(56) References Cited

U.S. PATENT DOCUMENTS

| | | |
|---|---|---|
| 4,838,900 A | 6/1989 | Hayes |
| 4,851,505 A | 7/1989 | Hayes |
| 4,880,442 A * | 11/1989 | Hayes ............................ 95/51 |
| 4,897,092 A | 1/1990 | Burgoyne, Jr. et al. |
| 4,952,220 A | 8/1990 | Langsam et al. |
| 5,074,891 A * | 12/1991 | Kohn et al. .................... 95/47 |
| 5,234,471 A * | 8/1993 | Weinberg ....................... 95/51 |
| 5,558,936 A * | 9/1996 | Chung et al. ................... 96/14 |
| 5,633,039 A * | 5/1997 | Avrillon ...................... 427/246 |
| 5,674,629 A | 10/1997 | Avrillon |
| 5,716,430 A * | 2/1998 | Simmons ....................... 96/13 |
| 7,303,609 B2 * | 12/2007 | Chung et al. ................... 96/10 |
| 7,803,214 B2 | 9/2010 | Kase et al. |
| 7,833,313 B2 | 11/2010 | Yoshinaga et al. |
| 8,366,804 B2 * | 2/2013 | Liu et al. ...................... 95/45 |
| 2010/0243567 A1 | 9/2010 | Liu et al. |
| 2010/0269698 A1 * | 10/2010 | Yates et al. ................... 96/10 |
| 2012/0067209 A1 * | 3/2012 | Sandru et al. .................. 95/51 |

OTHER PUBLICATIONS

ER, O. Orcun, et al., "Copolyimide Membranes for Gas Separation", Desalination, vol. 200 (2006), pp. 259-261, Sep. 2006.

* cited by examiner

THIN FILM GAS SEPARATION MEMBRANES

BACKGROUND OF THE INVENTION

The present invention generally relates to gas separation membranes and, more particularly, to aromatic polyimide gas separation membranes prepared from contacting acid dianhydrides with diamines.

Gas separation membranes (GSM) may be employed to separate a particular gas from a mixture of gases. For example, a GSM may be used to separate and remove oxygen from air so that a resultant gas mixture will not be combustible. GSM's may also be employed to separate carbon dioxide ($CO_2$) from methane ($CH_4$) and hydrogen ($H_2$) from $CH_4$.

Many GSM's are formed from polymers with molecular structures that have intermolecular spacings sufficiently small that they can discriminate between molecules of differing size, such as CH4 and H2, but with high enough fractional free volume that these gases can diffuse through the GSM. The degree to which the GSM provides selective blocking of some gases and passages of others is referred to as "selectivity" of the GSM.

Useful membranes for separating gases must have sufficient selectivity to distinguish between two gases, and must also have high flux. Flux is generally quantified as either permeance or permeability. Permeance, measured in Gas Permeation Units (GPU), is the gas flow (measured as cubic centimeter, $cm^3$, at standard temperature and pressure (STP)), per membrane area ($cm^2$), per trans-membrane pressure drop (cm Hg), per unit time (second or s): 1 GPU=$10^{-6}$ $cm^3$ (STP)/ $cm^2$ s (cm Hg). Permeability, measured in Barrer, is the permeance multiplied by the skin layer thickness of the membrane 1 Barrer=$10^{-10}$ $cm^3$ (STP) $cm/cm^2$ s (cm Hg). Flow through the membrane will increase with increasing membrane area or trans-membrane pressure drop, and will decrease with increased membrane selective layer thickness.

In this context, it is desirable that a GSM have low selective layer thickness. Indeed the lower the thickness of the selective layer, the higher the flux. But, thin GSM's tend to be fragile. Consequently, in many practical applications, a GSM may be supported on a base support structure. Such a supported structure may be substantially porous with respect to the gas mixtures that are the subject of separation. In other words, a material for a support structure may be selected to provide strength while not reducing flux.

As can be seen, there is a need to provide a GSM that may provide high separation selectivity for a gas mixture and a high flux. There is also a need to provide such a GSM in a structure that has sufficient strength for use in practical applications.

SUMMARY OF THE INVENTION

In one aspect of the present invention, a gas separation membrane comprises aromatic polyimide polymers that comprise a plurality of repeating units of formula (I)

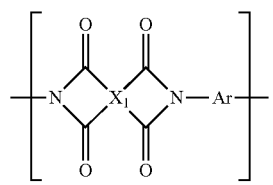

(I)

wherein
$X_1$ is selected from the group consisting of

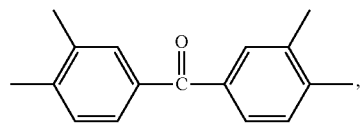

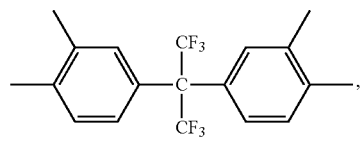

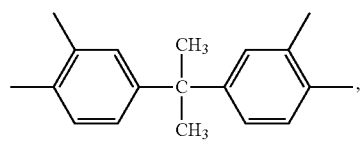

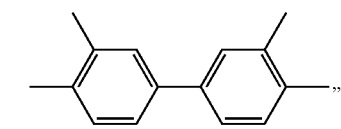

and mixtures thereof; and

Ar is selected from the group consisting of

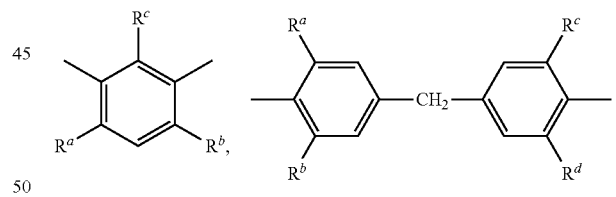

and mixtures thereof, wherein the phenyl groups of $X_1$ and Ar are independently optionally substituted with one or more substituents independently selected from the group consisting of $C_1$-$C_3$ alkyl, C—C alkoxy, halogen, nitro and —$NR^1R^2$, wherein $R^a$, $R^b$, $R^e$ and $R^d$ are each independently $C_1$-$C_3$ alkyl, and $R^1$ and $R^2$ are H or $C_1$-$C_3$ alkyl, provided that both $R^1$ and $R^2$ are not H.

In another aspect of the present invention, a gas separation unit comprises a thin-film gas separation membrane; a support structure for the membrane; and wherein the gas separation membrane comprises aromatic polyimide polymers that comprise a plurality of repeating units of formula (I)

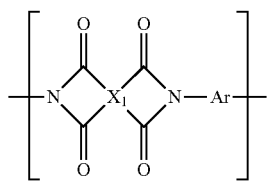

wherein
X₁ is selected from the group consisting of

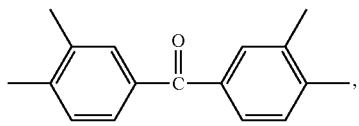

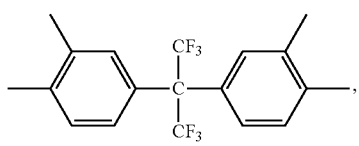

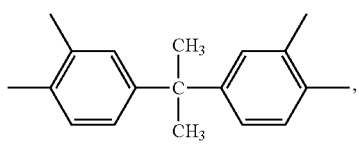

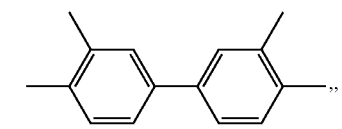

and mixtures thereof; and
Ar is selected from the group consisting of

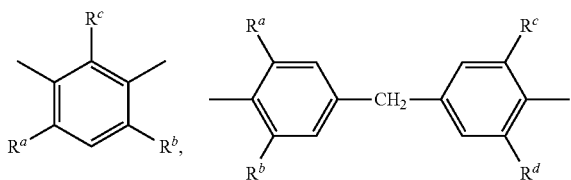

and mixtures thereof, wherein the phenyl groups of X₁ and Ar are independently optionally substituted with one or more substituents independently selected from the group consisting of $C_1$-$C_3$ alkyl, C—C alkoxy, halogen, nitro and —NR$^1$R$^2$, wherein R$^a$, R$^b$, R$^c$ and R$^d$ are each independently $C_1$-$C_3$ alkyl, and R$^1$ and R$^2$ are H or $C_1$-$C_3$ alkyl, provided that both R$^1$ and R$^2$ are not H.

In still another aspect of the present invention a gas separation membrane comprises aromatic polyimide polymers that comprise a plurality of repeating units of formula (I)

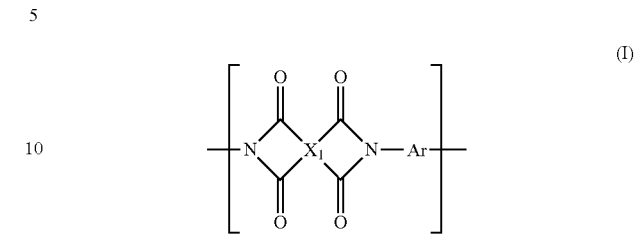

wherein
X₁ is selected from the group consisting of

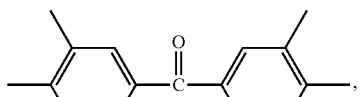

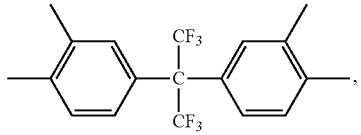

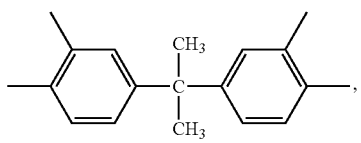

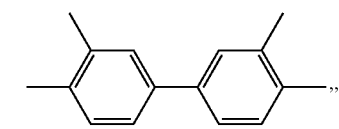

and mixtures thereof; and
Ar is selected from the group consisting of

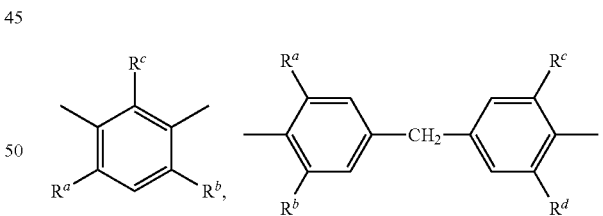

and mixtures thereof,
wherein:
the phenyl groups of X₁ and Ar are independently optionally substituted with one or more substituents independently selected from the group consisting of $C_1$-$C_3$ alkyl, C—C alkoxy, halogen, nitro and —NR$^1$R$^2$, R$^a$, R$^b$, R$^c$ and R$^d$ are each independently $C_1$-$C_3$ alkyl, R$^1$ and R$^2$ are H or $C_1$-$C_3$ alkyl, provided that both R$^1$ and R$^2$ are not H, and the polymer of formula (I) includes at least one repeating unit of formula (II)

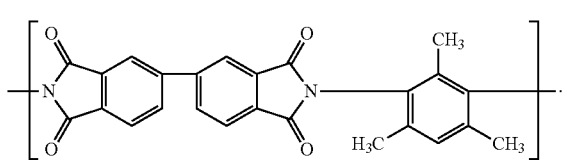

(II)

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention may be useful in selectively separating one or more gases from a mixture of gases. More particularly, embodiments of the present invention may provide for gas separation with a thin-film GSM supported on a strengthening structure. Embodiments of the present invention may be particularly useful in vehicles such as aircraft which may employ air separation modules to provide nitrogen-enriched air (NEA) to prevent accidental combustion in fuel tanks.

Figure 1A:
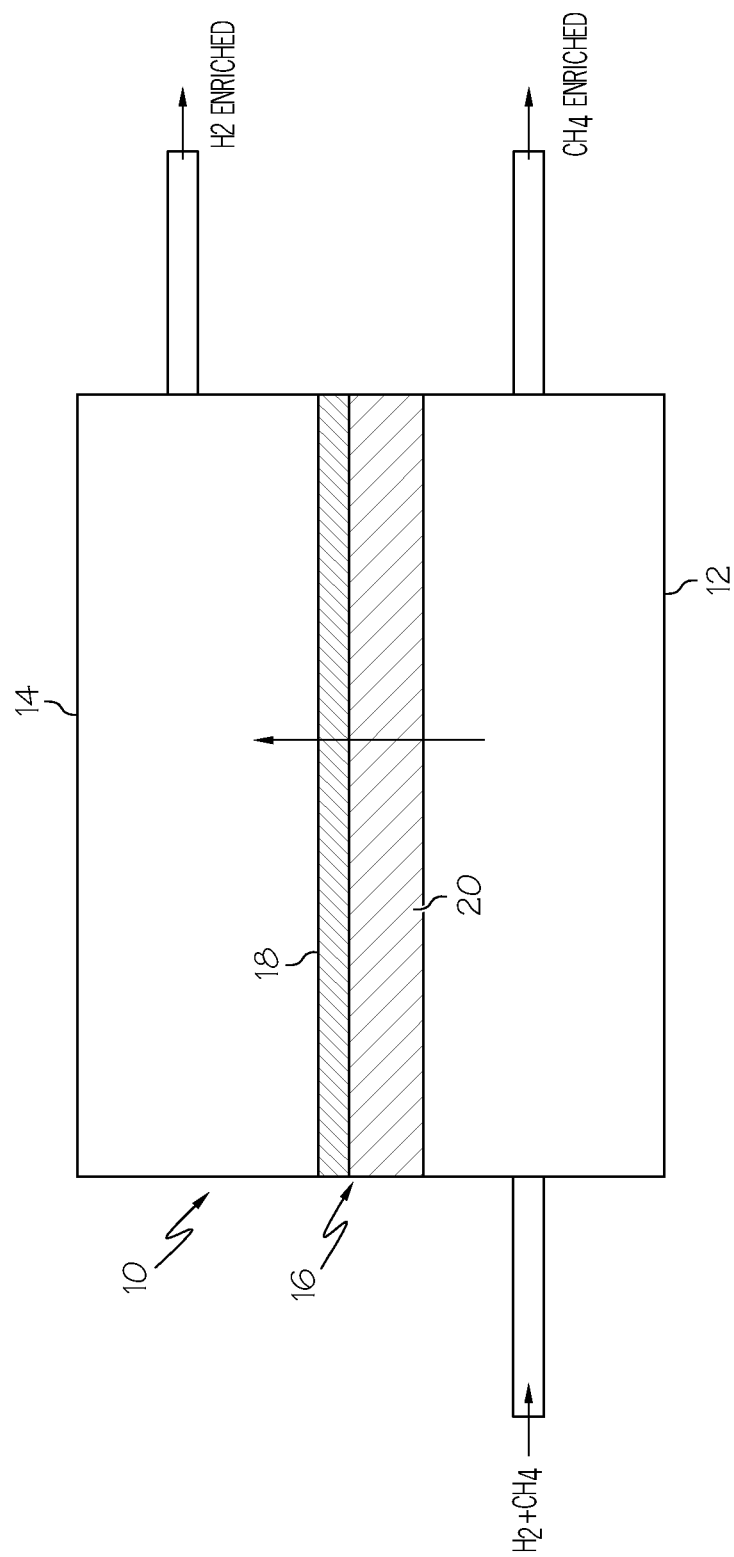
FIG. 1A is block diagram of a gas separator for separating hydrogen from methane in accordance with an embodiment of the present invention.

Referring now to FIG. 1A, an exemplary embodiment of the invention is illustrated in the context of separation of hydrogen gas ($H_2$, or simply, hydrogen) from methane ($CH_4$). A separator 10 may comprise an input chamber 12 and an output chamber 14. Methane may be passed through the input chamber 12 under pressure. As the methane passes through the input chamber 12, some hydrogen may diffuse through a gas separation unit designated generally by the numeral 16. The gas separation unit 16 may comprise a gas separation membrane (GSM) 18 and a support structure 20. The GSM 18 may be a thin film having an asymmetric structure and a thickness of between about 0.1 microns and 3 microns, as an example. Frequently such a GSM will be supported on a porous matrix which allows gases to flow easily while providing mechanical strength. This support layer may be comprised of the same material as the membrane, or a different material. In the illustrative embodiment of FIG. 1A, the GSM 18 is on an output side of the gas separation unit 16. One of the gas separation units 16 may also be employed in a configuration in which the GSM 18 is on an input side of the gas separation unit 16.

Figure 1B:
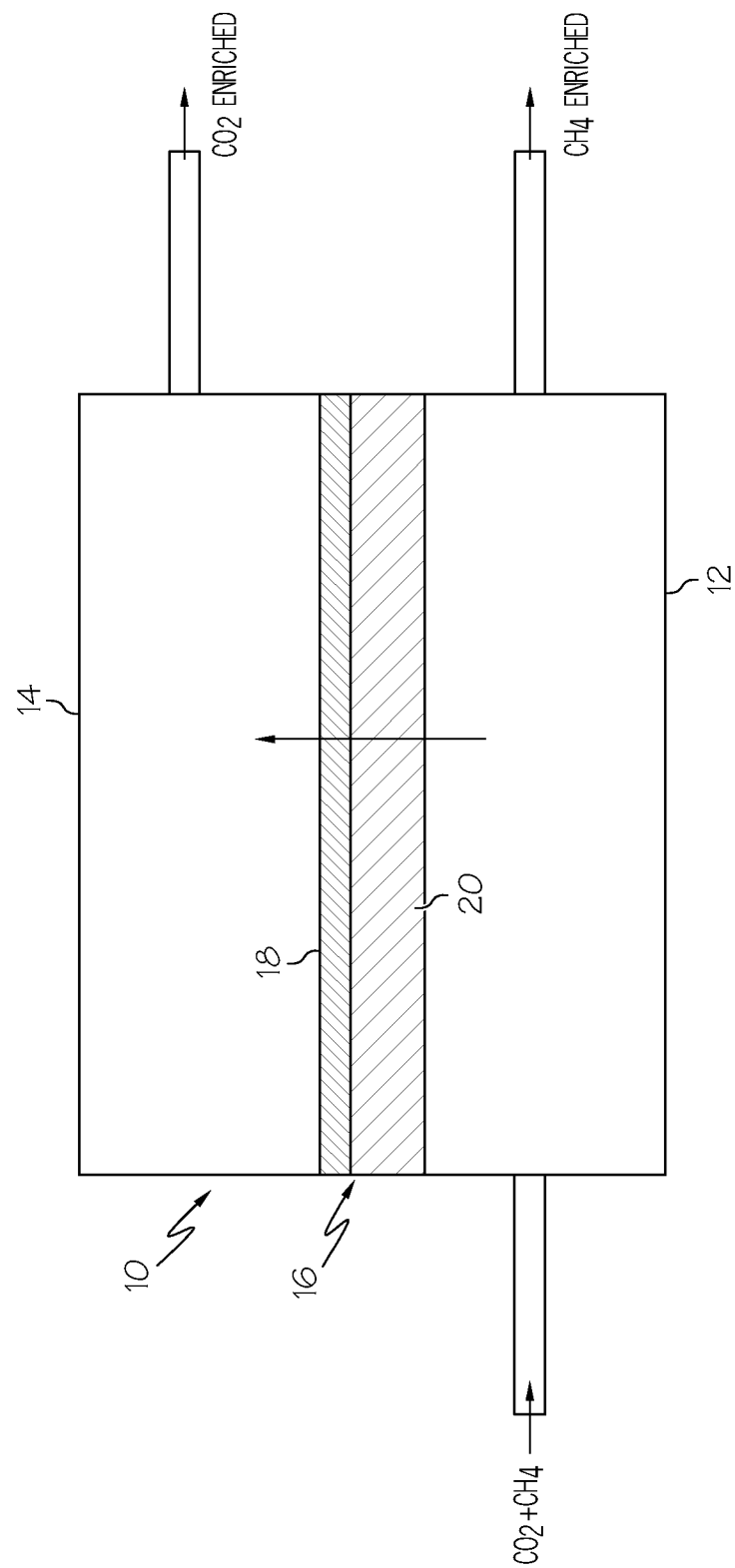
FIG. 1B is a block diagram of a gas separator for separating carbon dioxide from methane in accordance with an embodiment of the present invention.

Similarly, as illustrated in FIG. 1B, carbon dioxide ($CO_2$) may be separated from methane.

Figure 2:
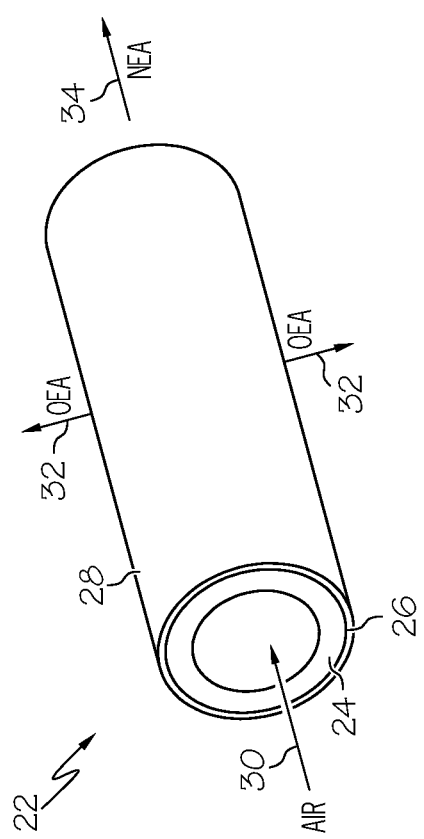
FIG. 2 is a perspective view of a portion of a gas separation fiber in accordance with an embodiment of the present invention.

Referring now to FIG. 2, an exemplary embodiment of the invention is illustrated in the context of separation of oxygen gas ($O_2$, or simply oxygen) from air. This type of gas separation may be referred to as $O_2/N_2$ separation. A gas separation unit may be formed as a gas separation hollow fiber membrane 22 that may comprise a hollow bore or air passage 24, a cylindrical supporting core 26 (as further described in the below Examples) and a cylindrical GSM 28 concentrically formed around the core 26. The GSM 28 may be a thin film with an asymmetric structure and a thickness of between about 0.1 microns and 3 microns, as an example.

Air, represented by arrows designated with numeral 30, may pass through the air passage 24 under pressure. Some selected gas may diffuse through the gas separation fiber more rapidly than other air components 22 during passage of the air 30 through the air passage 24. The resulting gas mixture may comprise oxygen and other air components wherein the oxygen concentration is significantly higher than in the air stream (oxygen enriched air (OEA)) which may be represented by outflowing arrows designated by the numerals 32. As the air 30 passes through the air passage 24, its oxygen concentration may be reduced over time. When gas emerges from the air passage 24, it may be in a form that may be considered nitrogen enriched air (NEA). The NEA may be represented by an arrow designated by the numeral 34.

The NEA 34 may be useful in fuel tanks of an aircraft. During flight of an aircraft, as fuel is consumed, its fuel tanks contain an increasing ullage volume in which air and fuel vapor may be present. There is a risk of accidental combustion of the air and fuel vapor if the oxygen concentration of the air is allowed to be greater than about 12% by volume. The gas separation hollow fiber membrane 22 of the present embodiment of the invention may be useful for $N_2/O_2$ separation in an aircraft to provide NEA to the fuel tanks and thereby preclude presence of oxygen concentration greater than 12% by volume in the fuel-tank air. In this context, a plurality of the gas separation hollow fibers 22 may be incorporated into an air separation module (ASM). Such an ASM is disclosed in US Patent Application 2008/0060523 which is incorporated by reference herein.

It has been found that certain aromatic polyimide polymers may be particularly useful for employment as GSM's in embodiments of the present invention. In particular it has been found that aromatic polyimides formed from certain acid dianhydrides and certain diamines may be useful in embodiments of the present invention.

Polymers which may be useful for the GSM's 18 and 28 may comprise aromatic polyimide polymers that may comprise a plurality of first repeating units of formula (I)

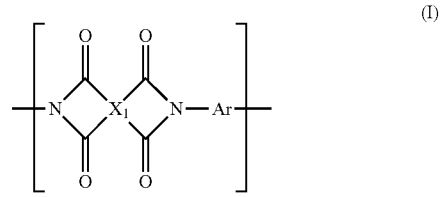

(I)

wherein

X₁ is selected from the group consisting of

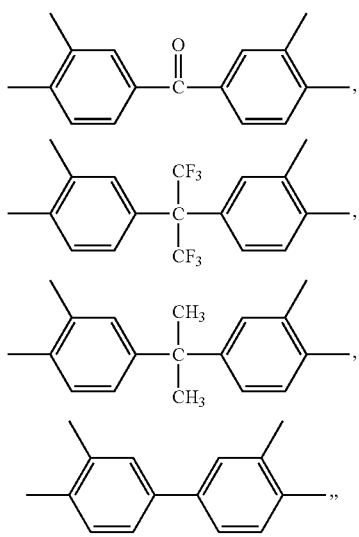

and mixtures thereof; and

Ar is selected from the group consisting of

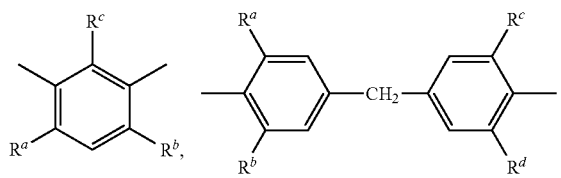

and mixtures thereof, wherein the phenyl groups of X₁ and Ar are independently optionally substituted with one or more substituents independently selected from the group consisting of $C_1$-$C_3$ alkyl, C—C alkoxy, halogen, nitro and —$NR^1R^2$, wherein $R^a$, $R^b$, $R^c$ and $R^d$ are each independently $C_1$-$C_3$ alkyl, and $R^1$ and $R^2$ are H or $C_1$-$C_3$ alkyl, provided that both $R^1$ and $R^2$ are not H.

Some examples of aromatic polyimide polymers useful for embodiments of the present invention may include, but are not limited to: poly(3,3',4,4'-biphenyltetracarboxylic dianhydride-2,4,6 trimethyl-m-phenylenediamine) derived from the condensation reaction of 3,3',4,4'-biphenyltetracarboxylic dianhydride (BPDA) and 2,4,6-trimethyl-m-phenylenediamine (3 MPDA), referred to as poly(BPDA-3 MPDA); poly(3,3',4,4'-biphenyltetracarboxylic dianhydride-3,3',4,4'-tetramethyl-4,4'-methlyene dianiline derived from the condensation reaction of 3,3',4,4'-biphenyltetracarboxylic dianhydride (BPDA) with 4,4'-methylenebis(2,6-dimethylaniline) (TMMDA), referred to as poly(BPDA-TMMDA); poly(2,2'-bis(3,4-dicarboxyphenyl) hexafluoropropane dianhydride-2,4,6-trimethyl-m-phenylenediamine derived from the condensation reaction of (2,2'-bis(3,4-dicarboxyphenyl) hexafluoropropane dianhydride (6FDA) with 3 MPDA, referred to as poly(6FDA-3 MPDA).

In some embodiments, the Ar group has the structure of formula (A) below:

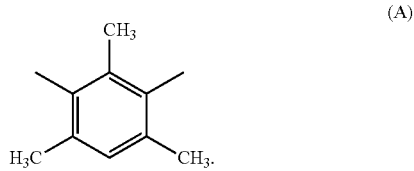

In some embodiments, the Ar group has the structure of formula (B) below:

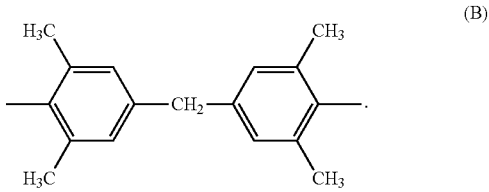

In some embodiments, the polymer of formula (I) must include formula (A) as at least a portion of the Ar groups. In some embodiments, the Ar group may include more than one chemical moiety. For example, in some embodiments, the Ar group includes both a moiety of formula (A) and formula (B).

In some embodiments, the X₁ group is formed from BPDA. In some embodiments, the X₁ group is formed from 6FDA. In some embodiments, the polymer of formula (I) must include an X₁ group formed from BPDA. In some embodiments, the polymer of formula (I) may be formed from more than one X₁ group.

In some embodiments, the polymer of formula (I) may be formed from a mixture of dianhydrides and diamines, provided that, in such a mixed polyimide, the polymer includes at least one repeating unit of the formula (II)

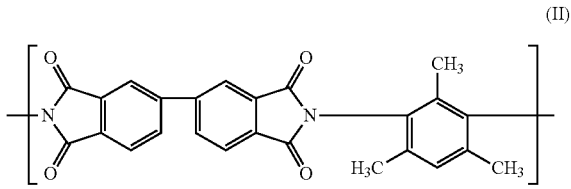

In an exemplary embodiment of the GSM 18 of FIGS. 1A and 1B aromatic polyimide polymers were prepared in accordance with the general preparation and in accordance with Examples 1 through 4 set forth below.

General Preparation

A polyimide of formula (I) is prepared by adding a stoichiometric amount of an acid dianhydride to a solution of a diamine in a solvent. The polymer concentration in the solvent is typically between 15-30 weight percent under an inert atmosphere. After the reaction is complete (for example, after the acid dianhydride is fully reacted), into the resulting polyamide acid (PAA) solution is added an anhydride, such as acetic anhydride, and an organic base, such as triethylamine. The solution is stirred for about 24 hours and poured into a bath of ethanol to precipitate the polyimide. The polyimide was filtered, washed with ethanol and dried in a vacuum over. The dried polymer is then formed into dense-film membranes.

Example 1

Poly BPDA-3 MPDA

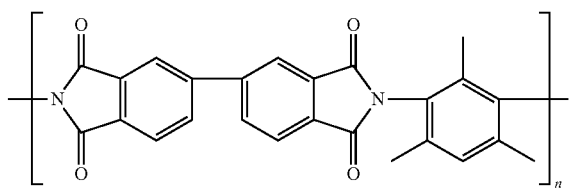

The polyimide BPDA-3 MPDA was prepared by adding 3,3',4,4'-biphenyltetracarboxylic dianhydride (11.7688 g, 40 mmole) to a solution of 2,4,6-trimethyl-m-phenylenediamine (6.0088 g, 40 mmole) in N-methyl-2-pyrrolidone (NMP, 51.9 ml) under a nitrogen atmosphere. After the dianhydride was fully reacted, to the resulting solution was added acetic anhydride (15 ml) and triethylamine (5 ml) and the resulting solution was stirred for 24 hours. The reaction was poured into excess ethanol to precipitate the solid polymer. The polymer was filtered, washed with ethanol twice, and dried in a 250 C vacuum oven.

Example 2

6FDA-3 MPDA

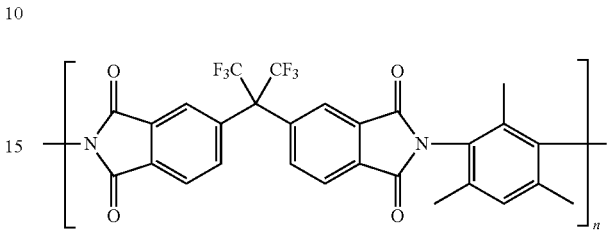

The polymer 6FDA-3 MPDA was prepared in a manner similar to that described above.

Example 3

BPDA-TMMDA/3 MPDA

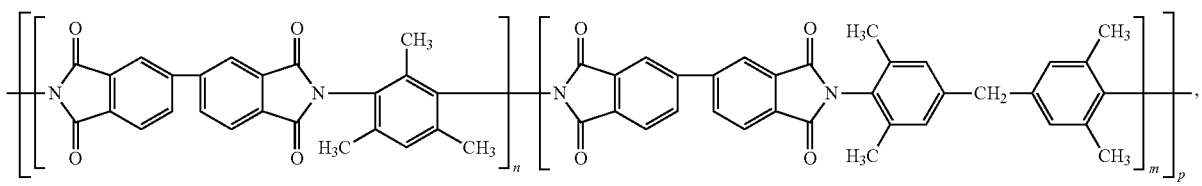

The mixed polymer BPDA-TMMDA/3 MPDA was prepared in a manner similar to that described above. A mixture of diamines (TMMDA and 3 MPDA) may be used to prepare this mixed polyimide. For example, a 1:1 mixture of TMMDA and 3 MPDA may be used. Typically, p is from 10 to 1000 and, for each p, n and m are independently from 1 to 10,000.

Example 4

BPDA/BTDA-3 MPDA

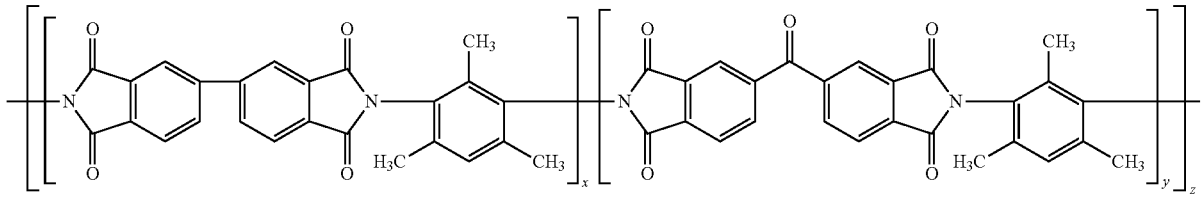

The mixed polymer BPDA/BTDA-3 MPDA was prepared in a manner similar to that described above. A mixture of dianhydrides (BDPA and BTDA) may be used to prepare this mixed polyimide. For example, a 1:1 mixture of BDPA and BTDA may be used. Typically, z is from 10 to 1000 and, for each z, x and y are independently from 1 to 10,000.

Example 5

Preparation of Film Membranes

The polymer of Example 1 was formed into a membrane having a thickness from about 40 to about 50 micrometers by casting 2-5 weight percent dichloromethane solutions of polyimide into a flat glass plate followed by evaporating the solvent slowly at room temperature. The case film was then dried at 60 C for 48 hours under vacuum to remove the residual solvent.

Other membranes were similar formed as shown in the table below.

The sample films were subjected to $O_2/N_2$ permeation testing in a permeation cell using a manometric permeability method. Film samples were clamped in the middle of a two-part chamber using a simple clamping mechanism. The measuring surface area of each chamber was 0.001 $m^2$. The first step of the measurement process was to evacuate the system. Once the pressure was stable at the set vacuum, the test gas was introduced at an inlet side of the sample. The permeation of a gas through the sample is driven by a pressure difference across the sample and measured by monitoring the change in downstream pressure. This is continued until sufficient sample points are measured, when a stable permeation rate was achieved.

The table below shows results for various membranes formed and tested.

TABLE 1

Pure gas permeation test results of polyimide polymers

| Example | Thickness (um) | $O_2$ permeability (barrier) | $N_2$ permeability (barrier) | $O_2/N_2$ selectivity (α) | Temperature (° C.) | Pressure (atm) |
|---|---|---|---|---|---|---|
| 1 (batch 1) | 45 | 37.6 | 5.9 | 6.3 | 35 | 2 |
| 1 (batch 2) | 51 | 35 | 5.4 | 6.4 | 35 | 2 |
| 2 (batch 1) | 35 | 144.8 | 42.0 | 3.45 | 35 | 2 |
| 2 (batch 2) | 35 | 152 | 36.9 | 4.12 | 35 | 2 |
| 2 (batch 3) | 35 | 158 | 39.3 | 4.02 | 35 | 2 |
| 3 (batch 1) | 35 | 15.4 | 2.11 | 7.3 | 35 | 2 |
| 3 (batch 2) | 39 | 14.6 | 2.0 | 7.42 | 35 | 2 |
| 4 (batch 1) | 46 | 20.9 | 3.89 | 5.37 | 35 | 2 |
| 4 (batch 2) | 40 | 20 | 2.78 | 5.29 | 35 | 2 |
| 4 (batch 3) | 37 | 18.3 | 3.45 | 5.3 | 35 | 2 |

Referring back to FIG. 2 and the gas separation hollow fiber membrane 22, it may be noted that the core 26 may be formed from a different polymer, such as PES and the GSM may be formed as a sheath layer 28 on the core 26. The sheath layer 28 may comprise a polyimide of formula (I) as herein above.

Figure 3:
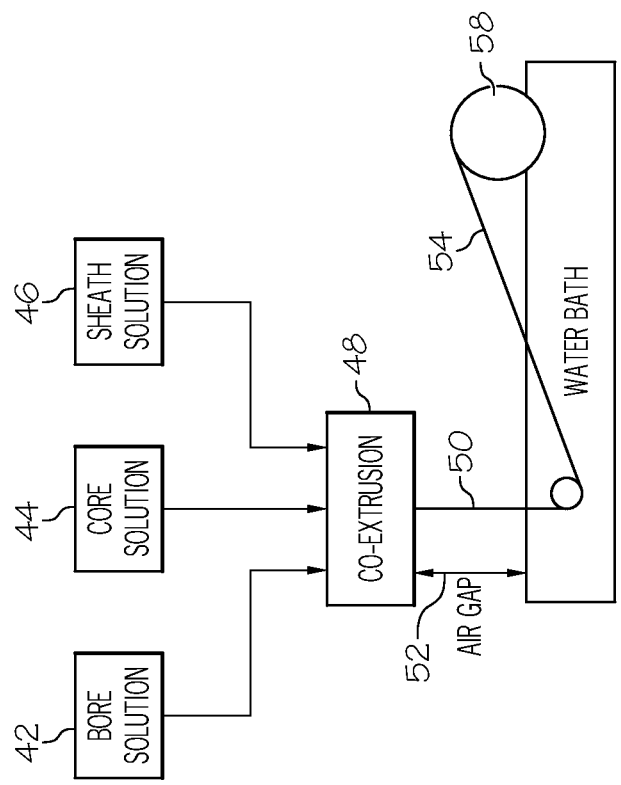
FIG. 3 is a block diagram of a system for producing a gas separation fiber in accordance with an embodiment of the present invention.

Referring now to FIG. 3, a block diagram may illustrate a system for producing the hollow fiber membrane 22 of FIG. 2. In general terms, production of gas separation hollow fiber membrane 22 may be described as a co-extrusion from three liquids followed by and a precipitation of the hollow fiber membrane 22. More specifically, the hollow fiber membrane 22 may result from co-extrusion of a bore solution 42, a core solution 44 and a sheath solution 46 through a co-extrusion spinneret 48. A three component liquid stream 50 may emerge from the spinneret 48 and pass through an air gap 52. The stream 50 may undergo transformation into a nascent fiber 54 as it passes into and through a water bath 56. The nascent fiber 54 may then be collected on a drum-like take-up reel 58. In subsequent conventional cleaning and drying processes (not shown) the nascent fiber 54 may be transformed into the gas separation hollow fiber membrane 22.

The air gap 50 may be about 10 centimeter (cm), as an example. As the fluid stream 50 passes through the air gap 52, some evaporation of solvents may occur. The sheath solution may be comprised of one or more solvents and non-solvents. The mixture of solvents and non-solvents may be chosen so that the polymer is on the edge of solubility. Thus, it may take very little loss of solvent via either evaporation or diffusion into the water bath to begin precipitation or coagulation. For example, NMP and 1,3-dioxolane, may be solvents, and isopropanol, acetone and octane may be non-solvents. In the above mixture, 1,3-dioxolane is volatile while NMP is much less volatile, and acetone is volatile while isopropanol and octane (relatively speaking) are less volatile. Thus, a mixture of solvents may be tailored to get the correct amount of evaporation in the air gap.

It should be understood, of course, that the foregoing relates to exemplary embodiments of the invention and that modifications may be made without departing from the spirit and scope of the invention as set forth in the following claims.

We claim:

1. A gas separation membrane comprising aromatic polyimide polymers that comprise a plurality of repeating units of formula:

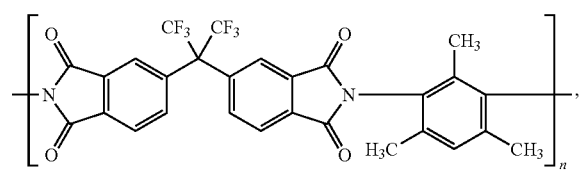

and/or

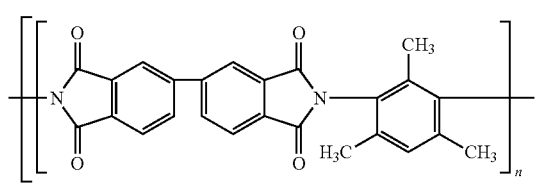

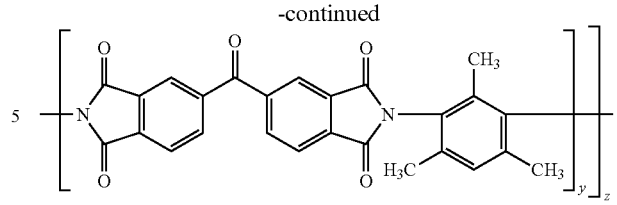

wherein:

n is from 1 to 10,000;

p is from 10 to 1000 and, for each p, n and m are independently from 1 to 10,000; and z is from 10 to 1000 and, for each z, x and y are independently from 1 to 10,000.

2. The gas separation membrane of claim 1, wherein the aromatic polyimide polymers include at least one repeating unit of formula:

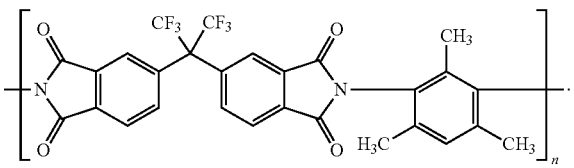

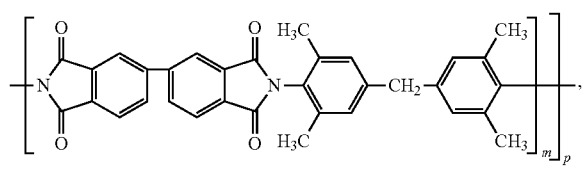

3. The gas separation membrane of claim 1, wherein the membrane has a shape of a cylinder formed concentrically formed around a hollow core.

4. The gas separation membrane of claim 1, wherein the aromatic polyimide polymers include at least one repeating unit of formula:

and/or

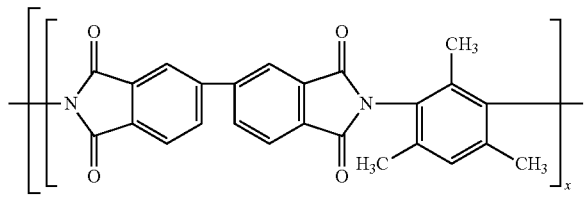

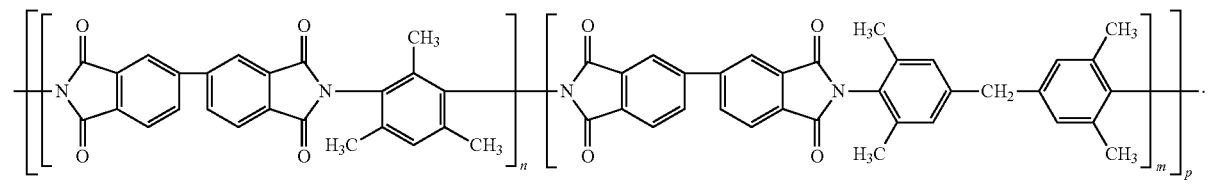

5. The gas separation membrane of claim 1, wherein the aromatic polyimide polymers include at least one repeating unit of formula:

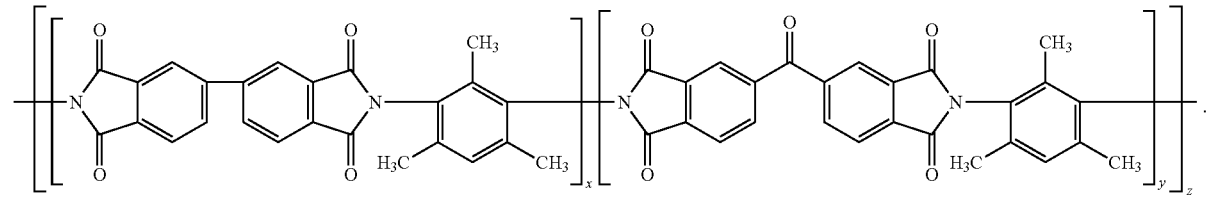

6. A gas separation unit comprising:

a thin-film gas separation membrane;
a support structure for the membrane; and wherein the gas separation membrane comprises aromatic polyimide polymers that comprise a plurality of repeating units of formula:

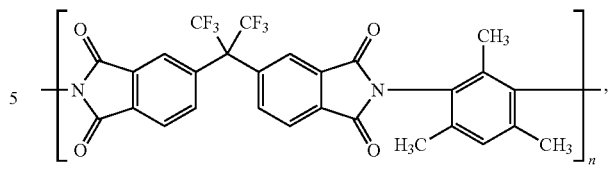

and/or

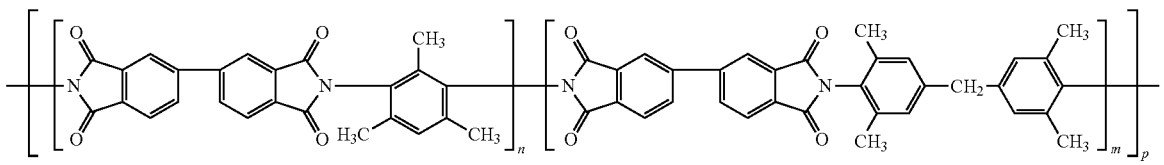

and/or

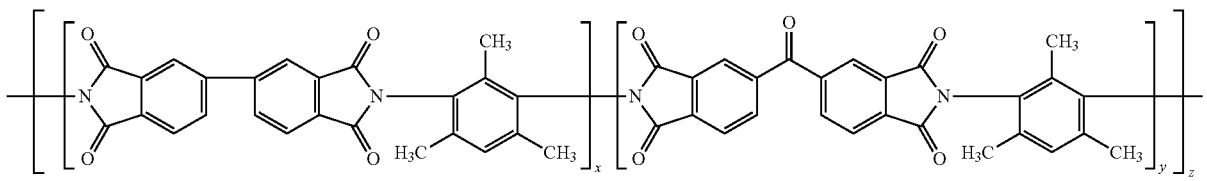

wherein:

n is from 1 to 10,000;

p is from 10 to 1000 and, for each p, n and m are independently from 1 to 10,000; and z is from 10 to 1000 and, for each z, x and y are independently from 1 to 10,000.

7. The gas separation unit of claim 6, wherein the aromatic polyimide polymers include at least one repeating unit of formula:

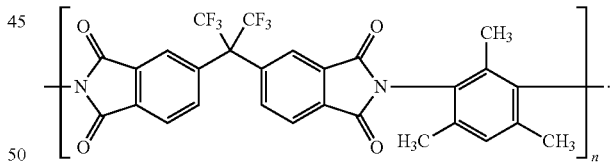

8. The gas separation unit of claim 6, wherein the aromatic polyimide polymers include at least one repeating unit of formula:

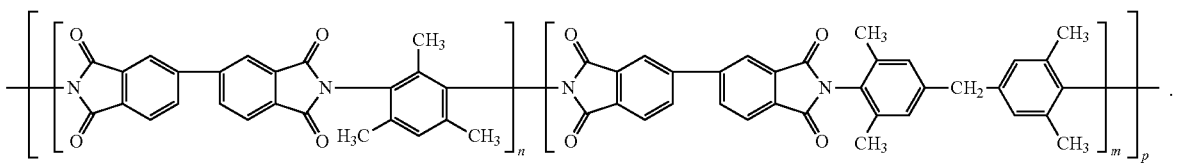

9. The gas separation unit of claim 6, wherein the aromatic polyimide polymers include at least one repeating unit of formula:
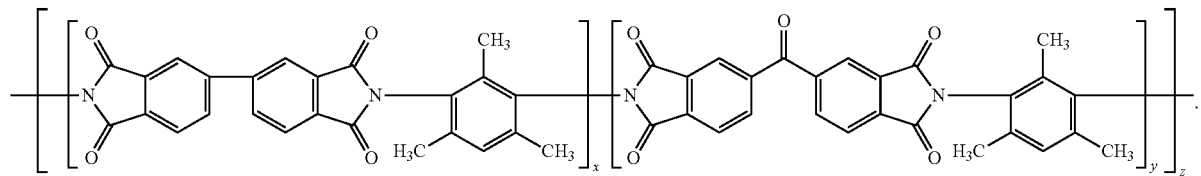
10. The gas separation unit of claim 6, wherein the support structure comprises PES.
11. The gas separation unit of claim 10, wherein the support structure is a hollow cylinder.
* * * * *